(12) United States Patent
Zutx

(10) Patent No.: US 6,976,681 B2
(45) Date of Patent: Dec. 20, 2005

(54) SLIDE RING SEAL ASSEMBLY INCLUDING A RADIAL, ROTATION PREVENTING ARRANGEMENT

(75) Inventor: Hans-Henning Zutx, Wermelskirchen (DE)

(73) Assignee: Federal-Mogul Friedberg GmbH, Friedberg (DE)

( * ) Notice: Subject to any disclaimer, the term of this patent is extended or adjusted under 35 U.S.C. 154(b) by 0 days.

(21) Appl. No.: 10/052,443

(22) Filed: Jan. 23, 2002

(65) Prior Publication Data

US 2002/0105147 A1      Aug. 8, 2002

(30) Foreign Application Priority Data

Feb. 2, 2001    (DE) ................. 101 04 788

(51) Int. Cl.[7] .............................................. F16J 15/34
(52) U.S. Cl. ................. 277/358; 277/370; 277/377; 277/393
(58) Field of Search ................ 277/358, 370, 277/371, 377, 380–382, 258, 385, 393

(56) References Cited

U.S. PATENT DOCUMENTS

| | | | | |
|---|---|---|---|---|
| 3,194,569 A | * | 7/1965 | Utvitch | 277/380 |
| 3,279,804 A | * | 10/1966 | Blair | 277/380 |
| 3,940,154 A | * | 2/1976 | Olsson | 277/381 |
| 4,183,542 A | * | 1/1980 | Quartara | 277/381 |
| 4,256,316 A | * | 3/1981 | Reinsma | 277/384 |
| 4,421,327 A | | 12/1983 | Morley et al. | |
| 4,489,952 A | * | 12/1984 | Ohtsuka | 277/399 |
| 4,548,547 A | * | 10/1985 | Deuring | 415/174.3 |
| 4,653,980 A | * | 3/1987 | Wentworth | 415/174.2 |
| 4,819,999 A | * | 4/1989 | Livesay et al. | 305/103 |
| 5,527,046 A | * | 6/1996 | Bedford | 277/381 |
| 5,642,890 A | * | 7/1997 | Zutz | 277/380 |
| 5,762,343 A | * | 6/1998 | Zutz | 277/371 |
| 6,086,069 A | * | 7/2000 | Bedford | 277/380 |

FOREIGN PATENT DOCUMENTS

DE    197 53 918    7/1999

* cited by examiner

Primary Examiner—Chuck Y. Mah
Assistant Examiner—Michael J Kyle
(74) Attorney, Agent, or Firm—Venable LLP; Stuart I. Smith

(57) ABSTRACT

A slide ring seal assembly includes a slide ring having an axially extending annular leg. The leg has radially outer and radially inner circumferential surfaces and a free axial end. A plurality of circumferentially spaced recesses are provided in leg at the free axial end thereof. Each recess extends from the radially outer surface to the radially inner surface. An annular sealing body surrounds the leg and is seated thereon. Circumferentially spaced, radially inward-oriented extensions forming part of the annular sealing body and projecting into respective recesses are provided in the leg for effecting a form-locking connection between the slide ring and the annular sealing body.

12 Claims, 2 Drawing Sheets

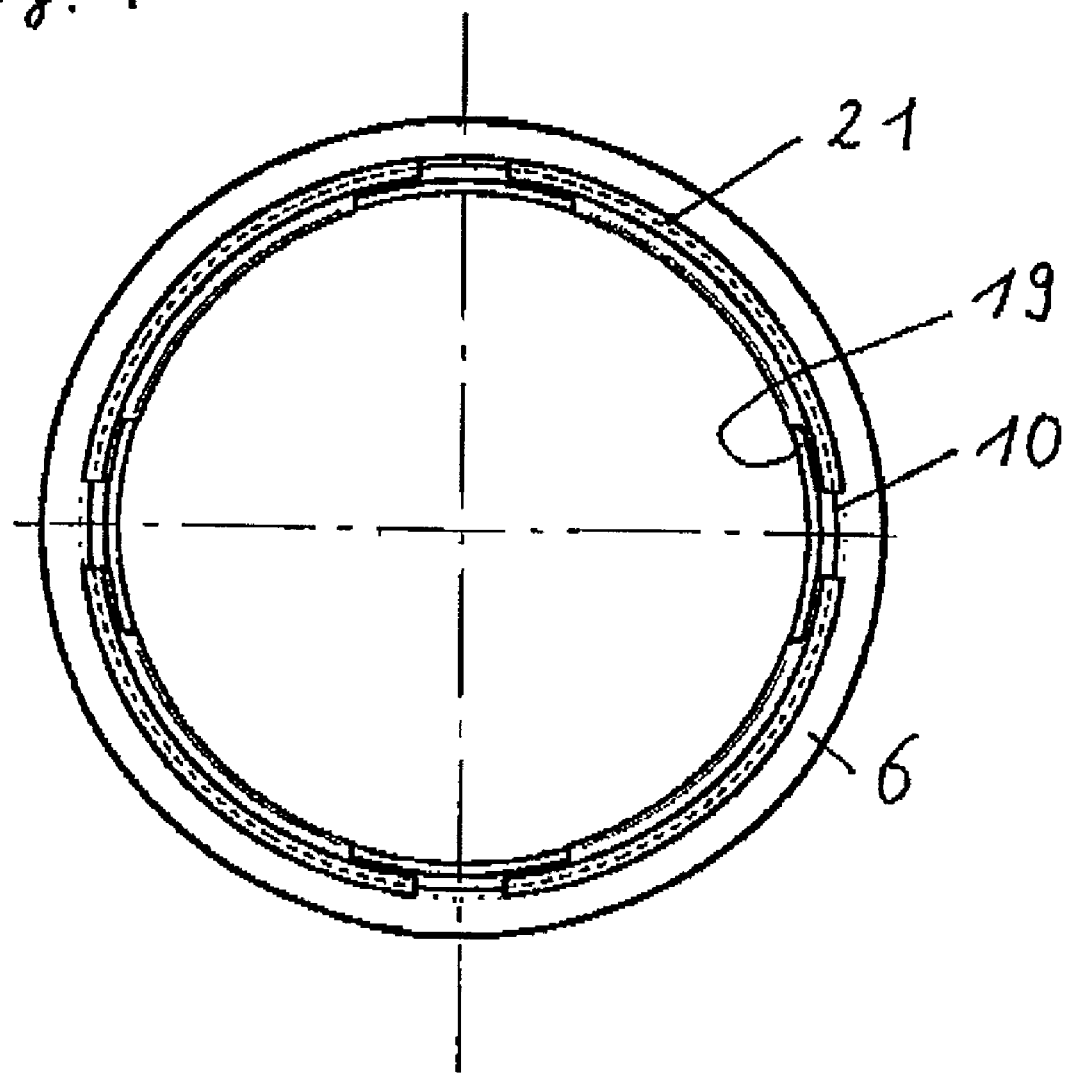

SLIDE RING SEAL ASSEMBLY INCLUDING A RADIAL, ROTATION PREVENTING ARRANGEMENT

CROSS REFERENCE TO RELATED APPLICATION

This application claims the priority of German Application No. 101 04 788.6 filed Feb. 2, 2001, which is incorporated herein by reference.

BACKGROUND OF THE INVENTION

The invention relates to a slide ring seal assembly, particularly a seal assembly for running gears. The seal assembly is composed of two, back-to-back arranged, cross-sectionally angled (L-shaped) slide rings whose axially extending legs form a seat for a stationary, cross-sectionally generally trapezoidal, resilient sealing body. The sealing bodies are secured against displacement by depressions provided in the outer upper surface of the legs.

Slide ring seal assemblies are used on shafts and axles and are inherently exposed to substantial soiling. Exemplary structures in which the slide ring seal assemblies may be used are drive axles of construction machinery or track-laying vehicles which are continuously exposed to sand, dust, mud and the like. Slide ring seal assemblies, particularly running gear seal assemblies where the slide rings have a cross-sectionally angled configuration often have cross-sectionally trapezoidal, spring-washer-shaped sealing bodies in which the slide rings are elastically supported. The annular sealing bodies which act as springs take over the function of the axial sealing pressure, the static seal between slide ring and seating bore and the frictional torque transmission. The axial force required for ensuring a seal is obtained by upsetting the elastic sealing body between the slide ring and its seating bore as the seal is stressed to assume its dimensions in the installed state. Particularly upon frictional torque transmission and distortion of the sealing body during installation or service, often malfunctioning and breakdown of the sealing properties are experienced.

A known slide ring seal assembly of the above-outlined type is described, for example, in German Patent No. 197 53 918. This patent describes a slide ring seal assembly having annular, cross-sectionally trapezoidal sealing bodies which are disposed between the axial legs of the slide rings and the seating bore. At the contact faces of the slide rings frictional torques appear which are transmitted by the sealing body to the housing. By virtue of the different distances from the axle center and thus from the null-line of the frictional torques, different forces in the supported surfaces of the sealing bodies appear. Thus, a relatively large force is obtained because of the short distance (leverage) to the outer upper face of the axial leg of the slide ring. A large distance (leverage) and thus a small force prevails between the null-line and the upper face of the seating bore. The frictional torques are conventionally transmitted by the surface pressure to the supporting surfaces of the sealing bodies. Due to the relatively high force effect on the outer upper surface of the axial leg of the slide ring, often the sealing body rotates with respect to the slide ring. Such a rotation causes a breakdown in the seal and thus renders the slide ring seal assembly defective.

To cure the above-outlined difficulty, U.S. Pat. No. 4,421,327 describes a slide ring seal assembly which includes a securing arrangement for preventing rotation of the sealing body. The forces on the upper surface of the axial leg of the slide ring are additionally taken up in a form-fitting manner by depressions provided therein. The sealing body thus can transmit significantly larger frictional torques. Such structures, however, involve the risk that the axially outer sealing body is twisted during dynamic stresses or even already in its installed state. As a result of such twist, the sealing body lifts off the radially outer upper surface of the slide ring leg, whereby a gap is formed between the slide ring leg and the sealing body. Dirt or lubricating oil may gain access to such a clearance. As an undesired result, the function of the slide ring seal assembly and the transmittable frictional torques are not optimal.

SUMMARY OF THE INVENTION

It is an object of the invention to provide an improved slide ring seal assembly which avoids the above-outlined disadvantages and which ensures a reliable operation.

This object and others to become apparent as the specification progresses, are accomplished by the invention, according to which, briefly stated, the slide ring seal assembly includes a slide ring having an axially extending annular leg. The leg has radially outer and radially inner circumferential surfaces and a free axial end surface. A plurality of circumferentially spaced recesses are provided in the leg and extend axially inward from the free axial end surface. Each recess extends from the radially outer surface to the radially inner surface. An annular sealing body surrounds the leg and is seated thereon. Circumferentially spaced, radially inward-oriented extensions forming part of the annular sealing body and projecting into respective recesses are provided in the leg for effecting a form-locking connection between the slide ring and the annular sealing body.

The invention overcomes the above-discussed mechanical disadvantages by virtue of the fact that the free axial end surface of the axial leg has recesses which reach from the radially outer surface to the radially inner surface, and the radially inward oriented extensions formed on the trapezoidal sealing body are received in the recesses. As a result, the trapezoidal sealing body is prevented from shifting in the circumferential direction. The recesses are so dimensioned that even in the case of an unavoidable axial twisting of the sealing body, a radially sufficient overlap is preserved to prevent a rotary motion of the sealing body. Primarily, however, the recesses and the extensions inserted therein serve for transmitting the frictional torques which are generated. In addition to the frictional transmission of the friction torques, the latter are also transmitted by a form fit. A turning of the sealing body relative to the slide ring is thus not possible.

To counteract a twisting of the sealing body and thus a risk that a gap will be formed, on the axial leg, at the inner surface, in the region of the recesses, undercuts may be provided into which the correspondingly shaped extensions of the sealing body may project.

According to a further advantageous feature of the invention, in addition to the undercuts, the axial legs of the slide rings have a radially outward-oriented enlargement at their axially outer end. The enlargements serve as supports underneath the sealing bodies to prevent a twisting thereof in the region between the recesses.

BRIEF DESCRIPTION OF THE DRAWINGS

FIG. 4 is an enlarged end view of a slide ring leg as viewed in the direction of the arrow IV in FIG. 1.

DESCRIPTION OF THE PREFERRED EMBODIMENT

Figure 1:
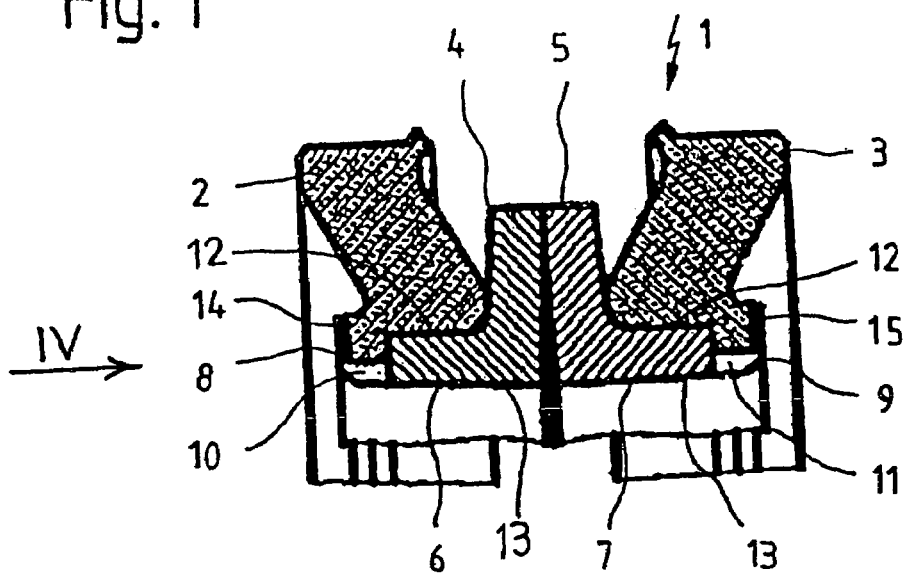
FIG. 1 is a fragmentary axial sectional view of a preferred embodiment of the slide ring seal assembly according to the invention.

FIG. 1 shows a slide ring seal assembly 1 having cross-sectionally trapezoidal annular sealing bodies 2, 3 and cross-sectionally angled (L-shaped) slide rings 4 and 5. The slide rings 4 and 5 have axially extending annular legs 6, 7. The axially extending annular legs 6,7 are provided with recesses 10 and 11 which extend from the radially outer circumferential surface 12 to the radially inner circumferential surface 13 of the respective legs 6, 7. The recesses 10 and 11 further extend axially inward from free axial end surfaces 8 and 9 of the legs 6, 7. The sealing bodies 2, 3 have, in the region of the recesses 10 and 11, radially inward oriented extensions 14, 15 which are received by the respective recesses 10 and 11.

Figure 2:
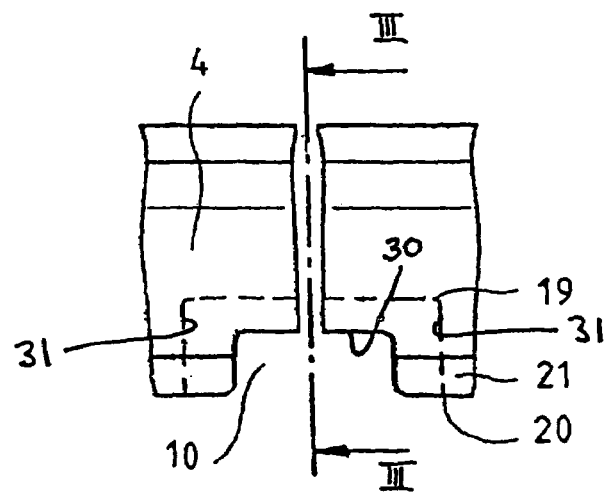
FIG. 2 is a fragmentary radial view of a slide ring structured according to the invention.

FIG. 2 shows, in the region of the recess 10, one part of a slide ring 4 according to the invention. The leg of the slide ring 4 has, at its axially outer end 20, a circumferentially extending enlargement 21 and an axially extending undercut 19 is shown in broken lines. The recess 10 has an axial end face 30 and two side walls 31.

Figure 3:
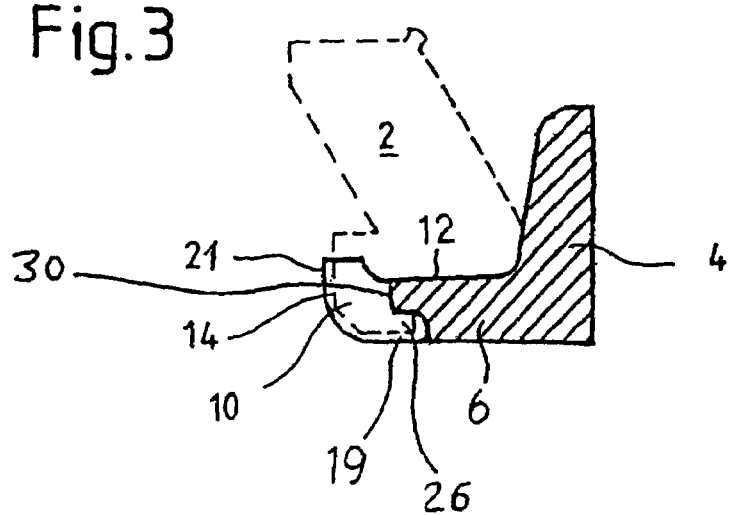
FIG. 3 is a sectional view taken along III—III of FIG. 2, showing a sealing body in phantom lines.

FIG. 3 illustrates the slide ring 4 along the section line III—III to show the recess 10, the undercut 19 and the radial enlargement 21. The annular sealing body 2 seated on the upper surface 12 of the axial leg 6 is shown in broken lines. The radial extension 14 of the sealing body 2 extends into the recess 10. The radial extension 14 further has an axial projection 26 which is received in the undercut 19.

FIG. 4 which is a full end view of the slide ring leg 6, illustrates the enlargement 21 and further shows, in an exemplary manner, four circumferentially uniformly distributed recesses 10, each continuing with an axially inward extending undercut 19.

It will be understood that the above description of the present invention is susceptible to various modifications, changes and adaptations, and the same are intended to be comprehended within the meaning and range of equivalents of the appended claims.

What is claimed is:

1. A slide ring seal assembly comprising:
   (a) a slide ring having an axially extending annular leg, said slide ring having an L-shaped cross-section, and said leg having radially outer and radially inner circumferential surfaces and a free axial end surface;
   (b) a plurality of circumferentially spaced recesses provided in said leg and extending axially inward from said free axial end surface, each said recess extending from said radially outer circumferential surface to said radially inner circumferential surface, each said recess having an axial end face and side walls, and with at least one of said recesses continuing with an axially extending undercut provided in said leg;
   (c) an annular sealing body surrounding said leg and being seated thereon; and
   (d) a plurality of circumferentially spaced, radially inward-oriented extensions forming part of said annular sealing body and projecting into respective said recesses provided in said leg for effecting a form-locking connection between said slide ring and said annular sealing body, with at least one of said radially inward-oriented extensions continuing With an axial projection received by said undercut,
   wherein at least one of the inward-oriented extensions contacts the axial end face and at least one of the side walls of the respective recess.

2. The slide ring seal assembly as defined in claim 1, wherein said leg has a circumferentially extending enlargement on said radially outer circumferential surface.

3. The slide ring seal assembly according to claim 1, wherein said slide ring is generally L-shaped and has a radially extending slide sealing surface.

4. The slide ring seal assembly according to claim 3, including a pair of said slide rings having their respective slide sealing surfaces in contact, and a respective said annular sealing body for each of said slide rings.

5. The slide ring assembly according to claim 1, wherein said slide ring is formed of metal and said annular sealing body is formed of a resilient material.

6. The slide ring assembly according to claim 5, wherein said annular sealing body has a generally trapezoidal cross-section.

7. The slide ring assembly according to claim 1, wherein the annular sealing body is seated on the leg under radial pressure.

8. A slide ring seal assembly comprising:
   (a) a slide ring having an axially extending annular leg, said slide ring having an L-shaped cross-section, and said leg having radially outer and radially inner circumferential surfaces and a free axial end surface;
   (b) a plurality of circumferentially spaced recesses provided in said leg and extending axially inward from said free axial end surface, each said recess extending from said radially outer circumferential surface to said radially inner circumferential surface, each said recess having an axial end face and side walls, and with at least one of said recesses continuing with an axially extending undercut provided in said leg;
   (c) an annular sealing body surrounding said leg and being seated thereon; and
   (d) a plurality of circumferentially spaced, radially inward-oriented extensions forming part of said annular sealing body and projecting into respective said recesses provided in said leg for effecting a form-locking connection between said slide ring and said annular sealing body, with at least one of said radially inward-oriented extensions continuing with an axial projection received by said undercut,
   wherein at least one of the inward-oriented extensions contacts at least one of the side walls of the respective recess.

9. A slide ring seal assembly comprising:
   (a) a slide ring having an axially extending annular leg, said slide ring having an L-shaped cross-section, and said leg having radially outer and radially inner circumferential surfaces and a free axial end surface;
   (b) a plurality of circumferentially spaced recesses provided in said leg and extending axially inward from said free axial end surface, each said recess extending from said radially outer circumferential surface to said radially inner circumferential surface, each said recess having an axial end face and side walls, and with at least one of said recesses continuing with an axially extending undercut provided in said leg;

(c) an annular sealing body surrounding said leg and being seated thereon; and (d) a plurality of circumferentially spaced, radially inward-oriented extensions forming part of said annular sealing body and projecting into respective said recesses provided in said leg for effecting a form-locking connection between said slide ring and said annular sealing body, with at least one of said radially inward-oriented extensions continuing with an axial projection received by said undercut, wherein at least one of the inward-oriented extensions contacts the axial end face of the respective recess.

10. The slide ring assembly according to claim 1, wherein the annular sealing body is removably in contact with the leg such that the annular sealing body can be moved out of contact with the leg without damaging the annular sealing body.

11. The slide ring assembly according to claim 8, wherein the annular sealing body is removably in contact with the leg such that the annular sealing body can be moved out of contact with the leg without damaging the annular sealing body.

12. The slide ring assembly according to claim 9, wherein the annular sealing body is removably in contact with the leg such that the annular sealing body can be moved out of contact with the leg without damaging the annular sealing body.

* * * * *